3,657,278
PROCESS FOR THE PREPARATION OF
ROSE OXIDE
Dieter Böse and Karlheinz Pfoertner, Basel, Switzerland, assignors to Givaudan Corporation, Clifton, N.J.
No Drawing. Original application Aug. 8, 1968, Ser. No. 751,070. Divided and this application June 29, 1970, Ser. No. 60,177
Int. Cl. C07d 7/14
U.S. Cl. 260—345.1                    4 Claims

ABSTRACT OF THE DISCLOSURE

An improved process for preparing the known, olfactorily-desirable Rose Oxide by pyrolyzing the novel 3-chloro-2,6-dimethyl-1-octen-8-ol, is disclosed, as well as a method for preparing the novel starting material.

This application is a divisional application of our copending U.S. patent application Ser. No. 751,070, filed Aug. 8, 1968, now abandoned.

BACKGROUND OF THE INVENTION

The product variously referred to as Rose Oxide, Rosenoxyd, etc., having the formula, 2-(2'-methyl-1'-propenyl)-4-methyltetrahydropyran, has attained a wide acceptance in perfumery, on account of its unique odor qualities. Thus, for example, it has the ability, either per se or in admixture with its isomer, 2-(2'-methyl-2'-propenyl)-4-methyltetrahydropyran, of imparting to artificial geranium oil, as well as to perfume compositions containing these odorants, odor qualities such as those possessed by the natural oil of geranium. Some of the properties of Rose Oxide and some citations to the literature regarding the utility of this product are set forth in U.S. Pat. 3,163,658, issued to Eschinasi and Cotter.

An object of the present invention is to provide a novel process for making Rose Oxide, starting from inexpensive and abundantly available reagents.

The provision of a novel intermediate for Rose Oxide is another object.

Other objects will be apparent from the following description.

SUMMARY OF THE INVENTION

This invention provides a commercially-feasible process for making Rose Oxide, by pyrolyzing the novel 3-chloro-2,6-dimethyl-1-octen-8-ol, which is easily produced from the known, inexpensive and abundant citronellol, 2,6-dimethyl-1-octen-8-oi.

DETAILED DESCRIPTION OF THE INVENTION

The process for making Rose Oxide is characterized in that the novel 3-chloro-2,6-dimethyl-1-octen-8-ol, either per se, or on a carrier, is pyrolyzed at any convenient temperature.

In general, temperatures above about 150° C. may be used, it being presently preferred to employ temperatures within the range from about 160° C. to about 260° C. for the pyrolysis. Carriers such as silica gel may be employed, if desired.

The pyrolysis in accordance with the invention yields a mixture of cis and trans isomers of Rose Oxide in which the cis isomer, particularly valuable from a fragrance point of view, predominates. The pyrolysates thus obtained can be purified by the usual purification methods (e.g. by vacuum distillation and/or column chromatography on silica gel).

It was surprising that 3-chloro-2,6-dimethyl-1-octen-8-ol would yield Rose Oxide on pyrolysis. This is so, inasmuch as other corresponding halogen compounds, such as the bromo compound, as well as other similar compounds differing only in that they possess functional groups such as $NO_2$, $SO_4$, $HSO_3$, etc., in place of Cl, do not yield Rose Oxide on pyrolysis. Further, ethers and esters corresponding to the starting chloro-citronellol do not operate to yield the desired Rose Oxide on pyrolysis.

The aforementioned novel starting material, 3-chloro-2,6-dimethyl-1-octen-8-ol, may be conveniently prepared by chlorination of the well-known citronellol, 2,6-dimethyl-2-octen-8-ol, also an odorant widely used in perfumery, as is shown, for example, in The Givaudan Index, pages 98–99.

In order to illustrate our invention further, the following examples are given. Unless otherwise stated, all degrees are in centigrade and parts are by weight.

EXAMPLE 1

3-chloro-2,6-dimethyl-1-octen-8-ol

A solution of 2 g. of 2,6-dimethyl-2-octen-8-ol in 250 ml. of carbon tetrachloride was treated, dropwise, with a solution of chlorine in carbon tetrachloride while a nitrogen stream, at the rate of 4 litres/min., was simultaneously led through the reaction solution. The reaction was stopped as soon as no more starting material was detectable by thin layer chromatography. The solvent was then drawn off in water-jet vacuum at 30° and the residue was chromatographed on silica gel (0.05–0.2 mm.) with a 95:5 mixture of petroleum ether and acetone, at 40°–50°. 3-chloro-2,6-dimethyl-1-octen-2-ol was obtained. IR: 908, 3083, 1646, 3344, 1060 cm.$^{-1}$. Yield 97%.

EXAMPLE 2

Rose Oxide (purification by chromatography)

3-chloro-2,6-dimethyl-1-octen-8-ol, as obtained in accordance with Example 1, was dropped into a flask heated to 260° (wall temperature). A nitrogen stream of about 1 litre/min. was simultaneously led through the flask. The pyrolysis products leaving the flask with the nitrogen stream were condensed and chromatographed on silica gel (0.05–0.2 mm.). The silica gel was eluted with 95:5 mixture of petroleum ether and acetone at 40°–50°. From 5.57 g. of 3-chloro-2,6-dimethyl-1-octen-8-ol, besides 3.73 g. of unreacted starting material, there was obtained 0.98 g. of cis-trans 2-(2'-methyl-1'-propenyl)-4-methyltetrahydropyran, in the ratio of cis:trans of 2:1.

EXAMPLE 3

Rose Oxide (purification of vacuum distillation)

20 g. of 3-chloro-2,6-dimethyl-1-octen-8-ol, obtained in accordance with Example 1, was pyrolyzed in accordance with Example 2. The reaction mixture was then treated with 5% (based on the starting material) of boron trioxide and heated at 100–110° for 5 minutes in order to convert alcoholic ingredients into non-volatile esters. Thereafter, a vacuum distillation was carried out. The fraction of boiling point 70–80°/10 mm. yielded 4.5 g. of pure cis 2 - (2'-methyl-1'-propenyl)-4-methyltetrahydropyran.

The foregoing illustrates the practice of this invention, which, however, is not to be limited thereby but is to be construed as broadly as permissible in view of the prior art and limited solely by the appended claims.

What is claimed is:
1. A process for preparing Rose Oxide, which comprises pyrolyzing 3-chloro-2,6-dimethyl-1-octen-8-ol.
2. A process in accordance with claim 1, wherein the pyrolyzing temperature is within the range from about 160° to about 260° C.
3. A process in accordance with claim 1, wherein the pyrolyzate is chromatographed.
4. A process in accordance with claim 1, wherein the pyrolyzate is vacuum distilled.

References Cited

UNITED STATES PATENTS

| | | | |
|---|---|---|---|
| 3,166,576 | 1/1965 | Markus | 260—345.1 |
| 3,564,021 | 2/1971 | Stapp | 260—345.1 |

JOHN M. FORD, Primary Examiner

U.S. Cl. X.R.

260—633; 252—522